US009024609B2

(12) United States Patent
Milavec

(10) Patent No.: US 9,024,609 B2
(45) Date of Patent: May 5, 2015

(54) CIRCUIT AND METHOD FOR PROVIDING HOLD-UP TIME IN A DC-DC CONVERTER

(71) Applicant: Power-One, Inc., Camarillo, CA (US)

(72) Inventor: Johann Ferdinand Milavec, Windisch (CH)

(73) Assignee: PAI Capital LLC, Camarillo, CA (US)

( * ) Notice: Subject to any disclaimer, the term of this patent is extended or adjusted under 35 U.S.C. 154(b) by 233 days.

(21) Appl. No.: 13/705,672

(22) Filed: Dec. 5, 2012

(65) Prior Publication Data
US 2014/0015322 A1 Jan. 16, 2014

Related U.S. Application Data

(60) Provisional application No. 61/670,440, filed on Jul. 11, 2012.

(51) Int. Cl.
G05F 1/00 (2006.01)
H02J 1/10 (2006.01)
H02M 3/155 (2006.01)
H02M 1/00 (2006.01)

(52) U.S. Cl.
CPC .......... *H02J 1/10* (2013.01); *H02M 3/155* (2013.01); *H02M 2001/0096* (2013.01)

(58) Field of Classification Search
USPC ......... 323/207, 222, 223, 224, 225, 284, 285; 363/65, 89
See application file for complete search history.

(56) References Cited

U.S. PATENT DOCUMENTS

| 5,420,780 | A | | 5/1995 | Bernstein et al. | |
|---|---|---|---|---|---|
| 5,844,399 | A | | 12/1998 | Stuart | |
| 5,847,548 | A | * | 12/1998 | He et al. | 323/222 |
| 6,185,082 | B1 | * | 2/2001 | Yang | 361/90 |
| 7,012,818 | B2 | * | 3/2006 | Kotsuji et al. | 363/21.01 |
| 7,061,212 | B2 | | 6/2006 | Phadke | |
| 7,382,113 | B2 | * | 6/2008 | Wai et al. | 323/222 |
| 7,729,143 | B2 | * | 6/2010 | Lin et al. | 363/65 |

(Continued)

FOREIGN PATENT DOCUMENTS

JP 2001218452 A 8/2001

OTHER PUBLICATIONS

International Search Report in Corresponding PCT Application PCT/US2013/034943, mailing date Jul. 25, 2013.

*Primary Examiner* — Jue Zhang
*Assistant Examiner* — Lakaisha Jackson
(74) *Attorney, Agent, or Firm* — Patterson Intellectual Property Law, P.C.; Mark J. Patterson; Gary L. Montle

(57) ABSTRACT

A power conversion system and method includes a DC-DC converter and an auxiliary circuit configured to ensure that a minimum input voltage is provided to the DC-DC converter during power interruption and for at least a predetermined hold-up time period. The auxiliary circuit includes an energy storage device, an auxiliary energy source for charging the energy storage device, and a clamping circuit to limit the energy stored by the energy storage device to a threshold voltage. A discharge time of the energy storage device from the threshold voltage to the minimum voltage thereby exceeds the predetermined hold-up time, but is only incrementally greater such that the size of the energy storage device is substantially reduced. The auxiliary energy source may typically be a current source, with the clamping circuit being control logic effective to disable the current source as a voltage across the storage device approaches the threshold.

20 Claims, 2 Drawing Sheets

(56) References Cited

U.S. PATENT DOCUMENTS

| | | |
|---|---|---|
| 8,085,556 B2 | 12/2011 | Moussaoui |
| 8,134,849 B2 | 3/2012 | Chang et al. |
| 8,222,872 B1 * | 7/2012 | Melanson et al. ............ 323/222 |
| 8,576,591 B2 * | 11/2013 | Phadke .......................... 363/65 |
| 2005/0030772 A1 | 2/2005 | Phadke |
| 2006/0274468 A1 * | 12/2006 | Phadke ........................ 361/93.1 |
| 2008/0274468 A1 * | 11/2008 | Bensussan et al. ............... 435/6 |
| 2013/0051101 A1 * | 2/2013 | Cao et al. ...................... 363/126 |

\* cited by examiner

US 9,024,609 B2

CIRCUIT AND METHOD FOR PROVIDING HOLD-UP TIME IN A DC-DC CONVERTER

CROSS-REFERENCES TO RELATED APPLICATIONS

This application claims benefit of the following patent application which is hereby incorporated by reference: U.S. Provisional Patent Application No. 61/670,440, filed on Jul. 11, 2012.

A portion of the disclosure of this patent document contains material that is subject to copyright protection. The copyright owner has no objection to the reproduction of the patent document or the patent disclosure, as it appears in the U.S. Patent and Trademark Office patent file or records, but otherwise reserves all copyright rights whatsoever.

BACKGROUND OF THE INVENTION

The present invention relates generally to circuits and methods for providing a required hold-up time for power converters. More particularly, the present invention relates to providing a hold-up time as requested in application-specific standards such as, for example, the railway standard EN 50155:2007, clause 5.1.1.2 "Interruption of Voltage Supply" (commonly referred to as hold-up time), class S2=10 ms.

Many electrical devices require one or more regulated DC voltages to operate. The power for such devices is often supplied by a DC-DC power converter that converts an input voltage into a regulated DC voltage required by the load device. Many power converters can operate over a wide input voltage range. However, if the input voltage falls below a threshold voltage and adversely affects operation of the converter, the load device may experience a critical failure. The period of time during which the power converter can continue to operate in the absence of a suitable input voltage is referred to as the "hold-up" time. One conventional way of providing a hold-up time is to connect a bulk capacitor in parallel with the input power source. During normal operation, energy can be stored in the bulk capacitor to provide the hold-up time. The hold-up time depends upon the size of the bulk capacitor and the available duty cycle for the converter. In typical power converter applications, large capacitors are needed to store the required energy to realize a hold-up time. However, in addition to the relatively high price and form factor, the use of such large capacitors further causes a high in-rush current. Furthermore, the storage capacitor must have a rated voltage for the highest converter input voltage and a capacity sufficient for the lowest input voltage. As a result, such a capacitor is very bulky and expensive.

It would therefore be desirable to provide a circuit which could reliably meet the standards for a required hold-up time, without the inherent problems associated with bulky and expensive storage capacitors.

BRIEF SUMMARY OF THE INVENTION

In accordance with various embodiments of the present invention, an auxiliary circuit is provided to discharge an appropriate voltage output to a DC-DC power converter during a hold-up time condition associated with a primary circuit, the primary circuit being configured to provide the appropriate voltage output during otherwise normal operating conditions.

In one embodiment of the invention, a power conversion system includes a DC-DC converter coupled to receive an input voltage from first and second input terminals during normal operation. An auxiliary circuit is configured to ensure that a minimum input voltage is provided to the DC-DC converter during power interruptions and for at least a predetermined hold-up time period. The auxiliary circuit includes an energy storage device, an auxiliary energy source for charging the energy storage device, and a clamping circuit to limit the energy stored by the energy storage device to a threshold voltage. A discharge time of the energy storage device from the threshold voltage to the minimum voltage is independent of the input voltage and thereby exceeds the predetermined hold-up time, but is only incrementally greater such that the size of the energy storage device is substantially reduced.

According to one aspect of the system, the auxiliary energy source may typically be a current source, with the clamping circuit having control logic effective to disable the current source as a voltage across the storage device approaches the threshold. Alternatively, the auxiliary energy source may simply be a resistor coupled between the first input terminal and the energy storage device.

According to another aspect of the system, the clamping circuit may be a zener diode having an anode coupled to the second input terminal as circuit ground, a cathode coupled to a node between the auxiliary energy source and the energy storage device, and further having a breakdown voltage corresponding to the threshold voltage.

According to another aspect of the system, the energy storage device is a capacitor which may preferably be rated to a voltage greater than but substantially corresponding to the threshold voltage. In this way, the size of the capacitor may be limited so as to reduce costs and bulk, while still ensuring the required hold-up time for the DC-DC converter.

In another embodiment of the invention, a power conversion system and method includes a first power converter (i.e., a boost converter) having an input side coupled across first and second input voltage terminals to receive an input voltage. The first power converter is effective during a normal operating condition wherein the input voltage is less than a first threshold voltage to boost the input voltage to a first output voltage of at least the first threshold voltage and provide the output voltage across first and second output terminals. A second power converter (e.g., a DC-DC converter) is coupled to the first and second output terminals and has a minimum operating voltage less than the first threshold voltage. An auxiliary circuit is coupled to the first and second output terminals in parallel with the first power converter, and includes an energy storage device, an auxiliary energy source, and a voltage clamping circuit coupled between the auxiliary energy source and the energy storage device to regulate the amount of energy from the auxiliary source charged in the energy storage device to a second threshold voltage.

A preferred aspect of this embodiment is that a discharge time of the energy storage device from the second threshold voltage to the minimum operating voltage of the second power converter exceeds a predetermined hold-up time, wherein the auxiliary circuit is effective during a hold-up time operating condition wherein the input voltage to the first power converter is removed to discharge from the energy storage device to the second power converter a second output voltage greater than the minimum operating voltage of the second power converter for at least the predetermined hold up time.

As with the previous embodiment, in another aspect the energy storage device is a capacitor which may preferably be rated to a voltage greater than but roughly corresponding to the threshold voltage, and also preferably substantially less than the maximum input voltage of an input voltage range with respect to the DC-DC power converter. In this way, the size of the capacitor may be limited so as to reduce costs and bulk, while still ensuring the required hold-up time for the DC-DC converter.

DETAILED DESCRIPTION OF THE INVENTION

Figure 1:
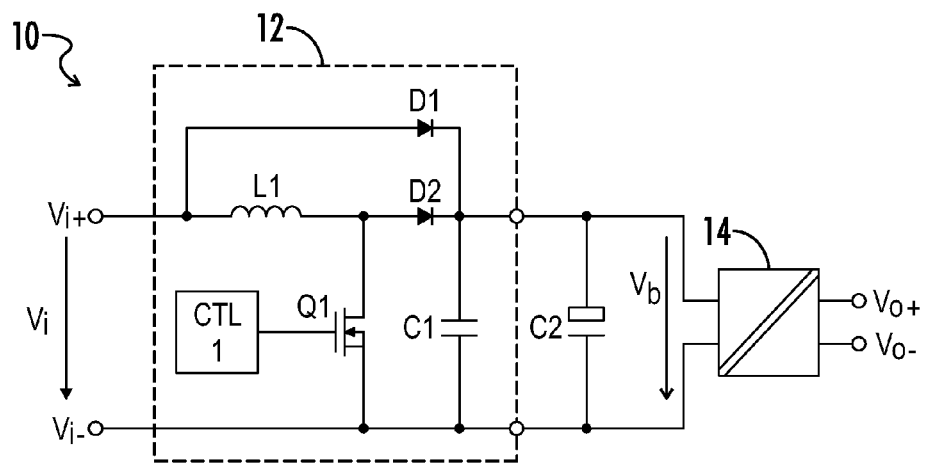
FIG. 1 is a circuit block diagram representing a power conversion system of the present invention with an exemplary boost converter for operation during a normal operating condition.

Throughout the specification and claims, the following terms take at least the meanings explicitly associated herein, unless the context dictates otherwise. The meanings identified below do not necessarily limit the terms, but merely provide illustrative examples for the terms. The meaning of "a," "an," and "the" may include plural references, and the meaning of "in" may include "in" and "on." The phrase "in one embodiment," as used herein does not necessarily refer to the same embodiment, although it may.

The term "coupled" means at least either a direct electrical connection between the connected items or an indirect connection through one or more passive or active intermediary devices.

The term "circuit" means at least either a single component or a multiplicity of components, either active and/or passive, that are coupled together to provide a desired function.

The term "signal" as used herein may include any meanings as may be understood by those of ordinary skill in the art, including at least an electric or magnetic representation of current, voltage, charge, temperature, data or a state of one or more memory locations as expressed on one or more transmission mediums, and generally capable of being transmitted, received, stored, compared, combined or otherwise manipulated in any equivalent manner.

The terms "switching element" and "switch" may be used interchangeably and may refer herein to at least: a variety of transistors as known in the art (including but not limited to FET, BJT, IGBT, JFET, MOSFET, etc.), a switching diode, a silicon controlled rectifier (SCR), a diode for alternating current (DIAC), a triode for alternating current (TRIAC), a mechanical single pole/double pole switch (SPDT), or electrical, solid state or reed relays. Where either a field effect transistor (FET) or a bipolar junction transistor (BJT) may be employed as an embodiment of a transistor, the scope of the terms "gate," "drain," and "source" includes "base," "collector," and "emitter," respectively, and vice-versa.

The terms "power converter" and "converter" unless otherwise defined with respect to a particular element may be used interchangeably herein and with reference to at least DC-DC, DC-AC, AC-DC, buck, buck-boost, boost, half-bridge, full-bridge, H-bridge or various other forms of power conversion or inversion as known to one of skill in the art.

Terms such as "providing," "processing," "supplying," "determining," "calculating" or the like may refer at least to an action of a computer system, computer program, signal processor, logic or alternative analog or digital electronic device that may be transformative of signals represented as physical quantities, whether automatically or manually initiated.

The terms "controller," "control circuit" and "control circuitry" as used herein may refer to a computer-readable and non-transitory memory medium such as may be embodied by or included within a general microprocessor, application specific integrated circuit (ASIC), microcontroller, or the like as may be designed and programmed to cause specific functions as further defined herein to be performed upon execution by a processing unit, either alone or in combination with a field programmable gate array or various alternative blocks of discrete circuitry as known in the art.

Figure 2:
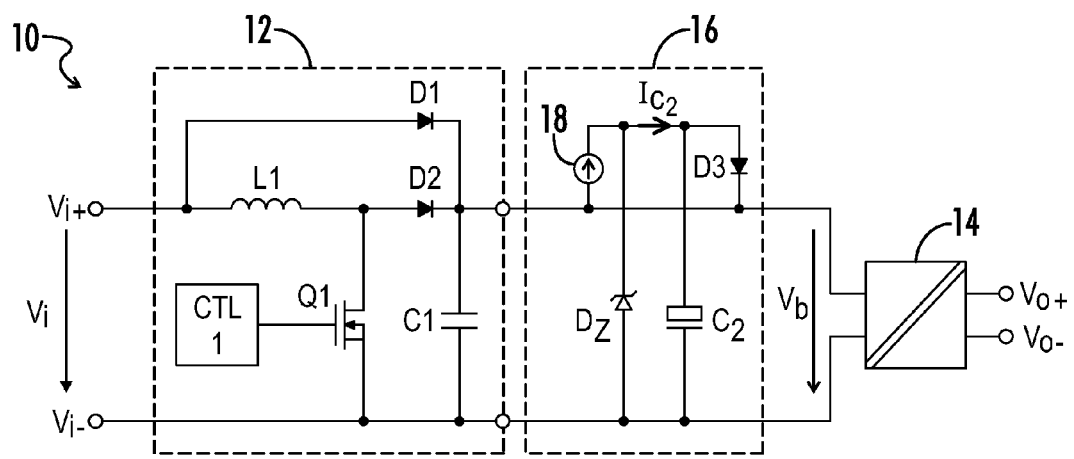
FIG. 2 is a circuit block diagram representing the circuit of FIG. 1, further including an embodiment of an auxiliary circuit according to the present invention for operation during a hold-up time operating condition.
Figure 3:
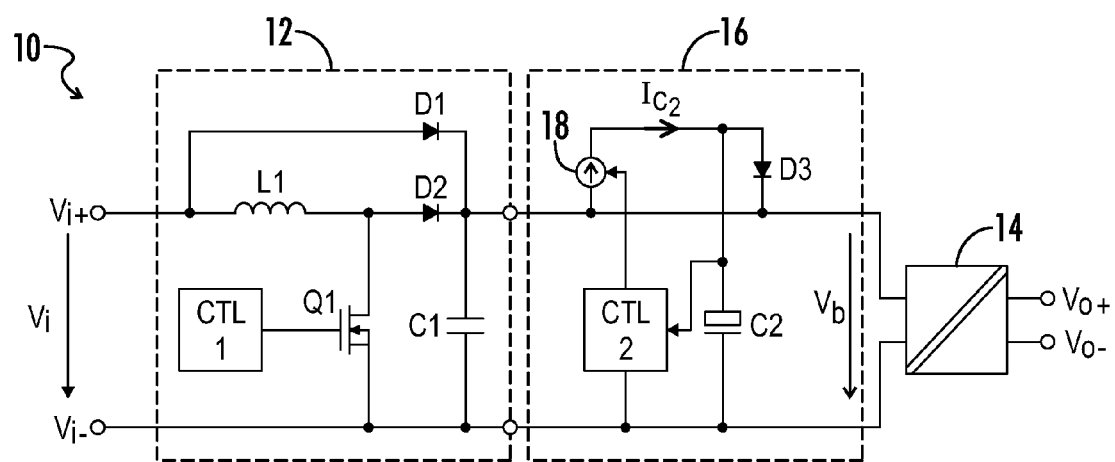
FIG. 3 is a circuit block diagram representing the circuit of FIG. 1, further including another embodiment of an auxiliary circuit according to the present invention for operation during a hold-up time operating condition.

Referring generally to FIGS. 1-3 various exemplary embodiments of system, circuits and methods may now be described in accordance with the present invention. Where the various figures may describe embodiments sharing various common elements and features with other embodiments, similar elements and features are given the same reference numerals and redundant description thereof may be omitted below.

A particular embodiment of the present invention has been designed with respect to railway applications, and further discussion herein of aspects of the present invention may relate directly to requirements associated with such applications, but the scope and subject matter of the present invention is not expressly limited to railway applications unless otherwise expressly stated.

In an exemplary power conversion system 10 as represented for example in FIG. 1, a first power converter 14 for generating an output across output terminals Vo+, Vo−, to a load (not shown) may be a DC-DC power converter having an input voltage range of Vi=43Vdc to 154Vdc, as suitable for input power sources (e.g., railway batteries) with 72, 96, 110 and 120Vdc nominal voltages. However, many railway batteries exhibit nominal voltages of 24, 36 or 48 Vdc, and these voltages are too small to adequately supply the aforementioned DC-DC power converters.

To accommodate the input voltage range of such converters and allow their use in railway applications (or other applications having such input power restrictions), a second power converter 12 may be provided which is effective to receive minimum input voltages of about 12Vdc, and step up (boost) the input voltage as needed to generate a sufficient intermediate voltage Vb to power the first DC-DC converter 14, for example wherein Vb=50Vdc or the like.

As represented in FIG. 1, the second power converter 12 may include first and second (i.e., positive and negative, respectively) input terminals Vi+, Vi−, an inductive element L1 and diode D2 coupled in series to the positive input terminal Vi+. A switching element Q1 such as a MOSFET having its drain is coupled to a node between the inductive element L1 and the diode D2 with its source coupled to the negative input terminal Vi−. A capacitor C1 may be coupled across output terminals for the converter 12, or in other words on a first end to the cathode of diode D2 and on a second end to the negative input terminal Vi−. A controller CTL1 detects an input voltage Vi to the power converter 12 and accordingly generates control signals to the gate of the switching element Q1 to regulate an output voltage Vb across capacitor C1 and otherwise from the converter 12.

To this end, one or more sensors (not shown) may be located across or in series with the input power terminals for the purpose of generating a feedback signal to the controller CTL1. By way of example but not limiting the scope of the invention, a capacitor across the input terminals may serve as a voltage sensor or a resistor positioned in series with either of the first or second input power terminals may serve as a current sensor by which the controller CTL1 may adequately determine an input signal. Those of skill in the art may appreciate the various alternative arrangements and components for obtaining such feedback signals, and further discussion herein may be omitted accordingly.

When the input voltage from the power source (e.g., railway battery) is greater than the desired intermediate voltage Vb, for example 50Vdc, the switching operation of the boost converter 12 may be disabled by the controller CTL1. A boost diode D1 (as represented in FIG. 1, having its anode coupled to a node between the positive input terminal Vi+ and the inductive element L1 and its cathode coupled to the node between the diode D2 and the output capacitor C1) may now conduct and transfer the input voltage Vi as to the intermediate voltage Vb. As previously described, this is acceptable for the DC-DC power converter 14 as it has a minimum input voltage range which includes the desired intermediate voltage Vb (e.g., an input range of 43Vdc to 154Vdc whereas the minimum intermediate voltage Vb may be predetermined as 50Vdc).

For applications where the input voltage Vi will never be less than the predetermined cutoff intermediate voltage Vb (e.g., 50Vdc), the boost converter 12 may therefore conceivably be eliminated from various embodiments of the system 10, as it would be anticipated that the switching operation would be disabled at all times. Referring to FIGS. 2 and 3, this would require simply providing the input voltage Vi directly to the auxiliary (hold-up time) circuit 16 during normal operation. This would not otherwise affect the scope of the present invention, however, as one of skill in the art may appreciate in view of the following discussion.

Returning again to FIG. 1, railway standards (e.g., EN 50155) request an interruption time (i.e., hold-up time) of 10 ms. One solution is to provide an energy storage device such as a large capacitor (not shown) connected in parallel across the input voltage terminals Vi+, Vi−, or a large capacitor C2 connected across the intermediate voltage Vb. However, this energy storage device (e.g., capacitor C2) would potentially be facing the highest possible input voltage Vi or intermediate voltage Vb for which the system 10 is designed (e.g., 154Vdc).

Consequently, such a capacitor C2 would need to be rated for a voltage higher than the maximum voltage of the input voltage range for the DC-DC converter 14, which in accordance with the example of 154Vdc as given above may require about 160Vdc or preferably even 200Vdc. Such a capacitor would be very bulky and expensive, and furthermore it summons a very high inrush current when the system 10 is switched on, which may threaten the input fuse or circuit breaker to trip. It may be understood generally that high inrush currents are therefore unacceptable for applications such as railway systems.

Referring now to FIG. 2, an embodiment of a power conversion system 10 of the present invention adds an auxiliary circuit branch 16 wherein the storage capacitor C2 is connected via a diode D3 to the intermediate voltage Vb, rather than directly across the intermediate voltage terminals as previously described.

A current source 18 as an auxiliary energy source 18 is coupled on a first end to the positive voltage rail (i.e., a first output end of the converter 12). A zener diode Dz as an exemplary voltage clamping circuit is coupled on a first end to a node between the auxiliary energy source 18 and the storage capacitor C2 and on a second end to the negative voltage rail (i.e., a second output end of the converter 12). In various embodiments the auxiliary energy source 18 may be a controlled current source, or alternatively for example an independent current source (not shown), or other equivalent configurations as may be known in the art. For example, the auxiliary energy source 18 may simply be a resistor (not shown) provided in place of the current source 18 in FIG. 2, with the voltage clamped as shown using for example a zener diode.

In operation, the diode D3 conducts whenever the intermediate voltage Vb drops below the voltage stored in the storage capacitor C2. Whenever the input voltage Vi to the system 10 is interrupted for any reason, the intermediate voltage Vb will drop first to the voltage in the storage capacitor C2, at which time a hold-up time operation condition may be defined with respect to the auxiliary circuit 16. The storage capacitor C2 may then ensure the functionality of the system 10 during a predetermined hold-up time (also called interruption time or ride-through time), as the storage capacitor C2 is slowly discharged to the minimum input voltage of the DC-DC converter 14 (e.g., 43Vdc).

The storage capacitor C2 is charged by the auxiliary energy source 18 only to a predetermined floating (threshold) voltage (e.g., 60Vdc), as determined by the clamping circuit. In the example shown in FIG. 2, a breakdown voltage for the zener diode Dz would be set at the predetermined threshold level to prevent additional energy from being provided to and stored in the energy storage capacitor C2. The threshold of, e.g., 60Vdc may be selected to allow for a discharge time from the storage capacitor C2 down to the minimum input voltage of the DC-DC converter 14 so as to at least cover the predetermined required hold-up time (e.g., 10 ms). This would satisfy every input voltage across the entire range (e.g., 12Vdc to 154Vdc), because the floating voltage of the storage capacitor C2 would be the same in each case.

As the required voltage to be stored in the storage capacitor C2 is limited to a threshold such as, e.g., 60Vdc, such a capacitor C2 can therefore be rated for a value substantially less than the maximum input voltage to the DC-DC power converter 14. Such a capacitor may be substantially less expensive and bulky in contrast to that of the large capacitor described above. For example, the storage capacitor C2 may be rated for a voltage such as 63V which is necessarily above the threshold but within about a 10% window above the threshold or some equivalent as may satisfy the operating conditions of the circuit while still optimizing the benefits of its application.

The storage capacitor C2 in an auxiliary circuit 16 according to the present invention does not produce any in-rush current, because it is charged by a separate current source 18 with a relatively small current. In theory, it may be that the hold-up time is only able to be provided by the auxiliary circuit 16 after the storage capacitor C2 is fully charged, e.g., within 30 seconds. In practice, however, this is not a problem for most applications wherein the initial startup time of the system takes much longer than 30 seconds.

Another potential issue may arise where the input voltage Vi is relatively high, as the current source 18 may in such cases create losses in the zener diode Dz provided to limit the voltage of the storage capacitor. Referring now to FIG. 3, in an embodiment of the present invention this potential issue may be resolved by replacing the zener diode Dz as the clamping circuit with a controller CTL2 which senses the voltage across the storage capacitor C2 and accordingly disables the auxiliary energy source 18 when the voltage across the storage capacitor approaches the threshold value or the rated voltage of the capacitor.

While the figures may represent first and second controllers as separate components, it may be understood that in embodiments of the present invention a single controller may physically embody the control logic and circuitry as described herein and as applicable to provide control signals for each of the boost converter 12 and the auxiliary circuit 16.

The previous detailed description has been provided for the purposes of illustration and description. Thus, although there have been described particular embodiments of the present invention of a new and useful "Circuit and Method for Providing Hold-Up Time in a DC-DC Converter," it is not intended that such references be construed as limitations upon the scope of this invention except as set forth in the following claims.

What is claimed is:

1. A power conversion system comprising:
a first power converter having an input side coupled across first and second input voltage terminals to receive an input voltage thereby, the first power converter effective during a normal operating condition when said input voltage is less than a first threshold voltage to step up the input voltage to a first output voltage of at least the first threshold voltage and provide said first output voltage across first and second output terminals;
a second power converter coupled to the first and second output terminals and having an input voltage range comprising a maximum input voltage greater than the first output voltage and a minimum input voltage less than the first threshold voltage;
an auxiliary circuit coupled to the first and second output terminals in parallel with the first power converter, the auxiliary circuit comprising an energy storage device, an auxiliary energy source, and a voltage clamping circuit coupled between the auxiliary energy source and the energy storage device, the auxiliary circuit effective to regulate the amount of energy from the auxiliary source charged in the energy storage device to a second threshold voltage less than the maximum input voltage of the second power converter;
wherein a discharge time of the energy storage device from the second threshold voltage to the minimum input voltage of the second power converter exceeds a predetermined hold-up time; and
the auxiliary circuit is effective during a hold-up time operating condition wherein the input voltage to the first power converter is removed to discharge from the energy storage device to the second power converter a second output voltage greater than the minimum operating voltage of the second power converter for at least the predetermined hold up time.

2. The power conversion system of claim 1, the clamping circuit comprising a zener diode having
an anode coupled to the second output terminal of the first power converter as circuit ground,
a cathode coupled to a node between the auxiliary energy source and the energy storage device, and
a breakdown voltage corresponding to the second threshold voltage.

3. The power conversion system of claim 2, the auxiliary energy source comprising a controlled current source coupled between said node and the first output terminal of the first power converter.

4. The power conversion system of claim 2, the auxiliary energy source comprising an independent current source.

5. The power conversion system of claim 2, the auxiliary energy source comprising a resistor coupled between said node and the first output terminal of the first power converter.

6. The power conversion system of claim 1, the clamping circuit comprising a controller effective to detect a voltage across the energy storage device and to regulate operation of the auxiliary energy source such that the detected voltage across the energy storage device corresponds to the second threshold voltage.

7. The power conversion system of claim 6, the auxiliary energy source comprising a controlled current source coupled between said node and the first output terminal of the first power converter.

8. The power conversion system of claim 6, the auxiliary energy source comprising an independent current source.

9. The power conversion system of claim 1, the energy storage device comprising a capacitor rated for a voltage less than 10% greater than the second threshold voltage.

10. The power conversion system of claim 1, the auxiliary circuit further comprising a diode having an anode coupled to a node between the auxiliary energy source and the energy storage device, and a cathode coupled to a positive input terminal for the second power converter, said diode conductive when the first output voltage drops below the voltage of the energy storage device.

11. A power conversion system comprising:
a power converter coupled to first and second input voltage terminals and effective to receive thereby from a voltage source a first input voltage greater than a minimum input voltage and less than a maximum input voltage;
a hold-up time circuit coupled to the first and second input voltage terminals in parallel with said voltage source, the hold-up time circuit comprising an energy storage device, an auxiliary energy source for charging the energy storage device, and a clamping circuit effective to limit the energy stored by the energy storage device to a predetermined threshold voltage less than the maximum input voltage for the power converter;
wherein a discharge time of the energy storage device from the predetermined threshold voltage to the minimum voltage exceeds a predetermined hold-up time; and
the hold-up time circuit is effective to determine a hold up time operating condition wherein the first input voltage is disabled and upon determining said operating condition to discharge from the energy storage device to the power converter a second input voltage greater than the predetermined threshold voltage for at least the predetermined hold up time.

12. The power conversion system of claim 11, the clamping circuit comprising a zener diode having
an anode coupled to the second input voltage terminal as circuit ground,
a cathode coupled to a node between the auxiliary energy source and the energy storage device, and
a breakdown voltage corresponding to the predetermined threshold voltage.

13. The power conversion system of claim 12, the auxiliary energy source comprising a controlled current source coupled between said node and the first input voltage terminal.

14. The power conversion system of claim 12, the auxiliary energy source comprising an independent current source.

15. The power conversion system of claim 12, the auxiliary energy source comprising a resistor coupled between said node and the first output voltage terminal.

16. The power conversion system of claim 11, the clamping circuit comprising a controller effective to detect a voltage across the energy storage device and to regulate operation of the auxiliary energy source such that the detected voltage across the energy storage device corresponds to the predetermined threshold voltage.

17. The power conversion system of claim 16, the auxiliary energy source comprising a controlled current source coupled between said node and the first output voltage terminal.

18. The power conversion system of claim 16, the auxiliary energy source comprising an independent current source.

19. The power conversion system of claim 11, the energy storage device comprising a capacitor rated for a voltage less than 10% greater than the predetermined threshold voltage.

20. A method of maintaining a predetermined hold-up time for an output power converter in a power conversion system further comprising an input power converter and an auxiliary circuit coupled to the output power converter in parallel with an output from the input power converter, the output power converter having a minimum and a maximum input voltage, the method comprising:

during a normal operating condition wherein an input voltage to the input power converter is present, providing from the input power converter to the output power converter an intermediate voltage greater than the minimum input voltage of the output power converter;

charging an energy storage device in the auxiliary circuit to an auxiliary voltage threshold less than the maximum input voltage of the output power converter, wherein a discharge time for the auxiliary voltage to the minimum input voltage of the output power converter exceeds the predetermined hold up time;

clamping the auxiliary voltage stored in the energy storage device to the auxiliary voltage threshold during a hold-up time condition wherein the input voltage is interrupted with respect to the input power converter, discharging the auxiliary voltage from the energy storage device as an operating input to the output power converter.

\* \* \* \* \*